United States Patent
Rai et al.

(10) Patent No.: US 10,404,564 B2
(45) Date of Patent: Sep. 3, 2019

(54) SYSTEM AND METHOD FOR CONTINUOUS IN-LINE MONITORING OF DATA-CENTER TRAFFIC

(71) Applicant: Cisco Technology, Inc., San Jose, CA (US)

(72) Inventors: Smita Rai, San Jose, CA (US); Ajay Modi, San Jose, CA (US); Krishna Doddapaneni, San Jose, CA (US); Kit Chiu Chu, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 17 days.

(21) Appl. No.: 15/410,595

(22) Filed: Jan. 19, 2017

(65) Prior Publication Data

US 2018/0205624 A1    Jul. 19, 2018

(51) Int. Cl.
*H04L 12/26* (2006.01)

(52) U.S. Cl.
CPC ........ *H04L 43/0852* (2013.01); *H04L 43/026* (2013.01); *H04L 43/062* (2013.01); *H04L 43/18* (2013.01)

(58) Field of Classification Search
CPC . H04L 43/0852; H04L 43/062; H04L 43/026; H04L 43/18

USPC .......................................................... 370/252
See application file for complete search history.

(56) References Cited

U.S. PATENT DOCUMENTS

| | | | |
|---|---|---|---|
| 7,564,796 B2 | 7/2009 | Loyd et al. | |
| 7,987,257 B1 | 7/2011 | Stewart et al. | |
| 9,049,216 B2 | 6/2015 | McCanne et al. | |
| 2007/0005786 A1* | 1/2007 | Kumar | G06F 8/656 709/230 |
| 2014/0105038 A1* | 4/2014 | Yu | H04L 43/065 370/252 |
| 2015/0124645 A1* | 5/2015 | Yadav | H04L 41/0806 370/254 |
| 2015/0281028 A1 | 10/2015 | Akhter et al. | |
| 2016/0315912 A1* | 10/2016 | Mayya | H04L 45/42 |
| 2016/0323166 A1* | 11/2016 | Pandey | H04L 43/087 |
| 2016/0359872 A1 | 12/2016 | Yadav et al. | |

* cited by examiner

*Primary Examiner* — Sai Ming Chan
(74) *Attorney, Agent, or Firm* — Polsinelli PC

(57) ABSTRACT

Disclosed is a method for continuous in-line monitoring of data-centric traffic to guarantee application performance. The method includes, in each switch of a plurality of switches in a network fabric, grouping all packets entering each respective switch of the plurality of switches based on either 5-tuple applications or EPG based applications, collecting performance statistics at every hop in the network fabric across all flows in-line in a flow table maintained in each respective switch and periodically exporting the performance statistics to analysis module.

20 Claims, 4 Drawing Sheets

SYSTEM AND METHOD FOR CONTINUOUS IN-LINE MONITORING OF DATA-CENTER TRAFFIC

TECHNICAL FIELD

The present disclosure relates to monitoring network traffic and more specifically a method of providing continuous in-line monitoring of data-center traffic for guaranteeing application performance.

BACKGROUND

Datacenter networks present unique challenges for debugging and troubleshooting with their scale and traffic volume. Datacenter operators often deploy monitoring solutions which are either packet-based like SPAN or flow-based such as netflow which give more visibility into the traffic. Applications may also require service level agreements (SLAs) guaranteeing latency/quality-of-service for performance and network operators need efficient mechanisms to proactively debug if these requirements are violated and quickly isolate problems.

Netflow and IPFIX formats export the first and last timestamp for a flow in an export interval. This data can typically help in calculating the duration of the flow but cannot pinpoint if certain frames within the flow experienced latency spikes at certain hops.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
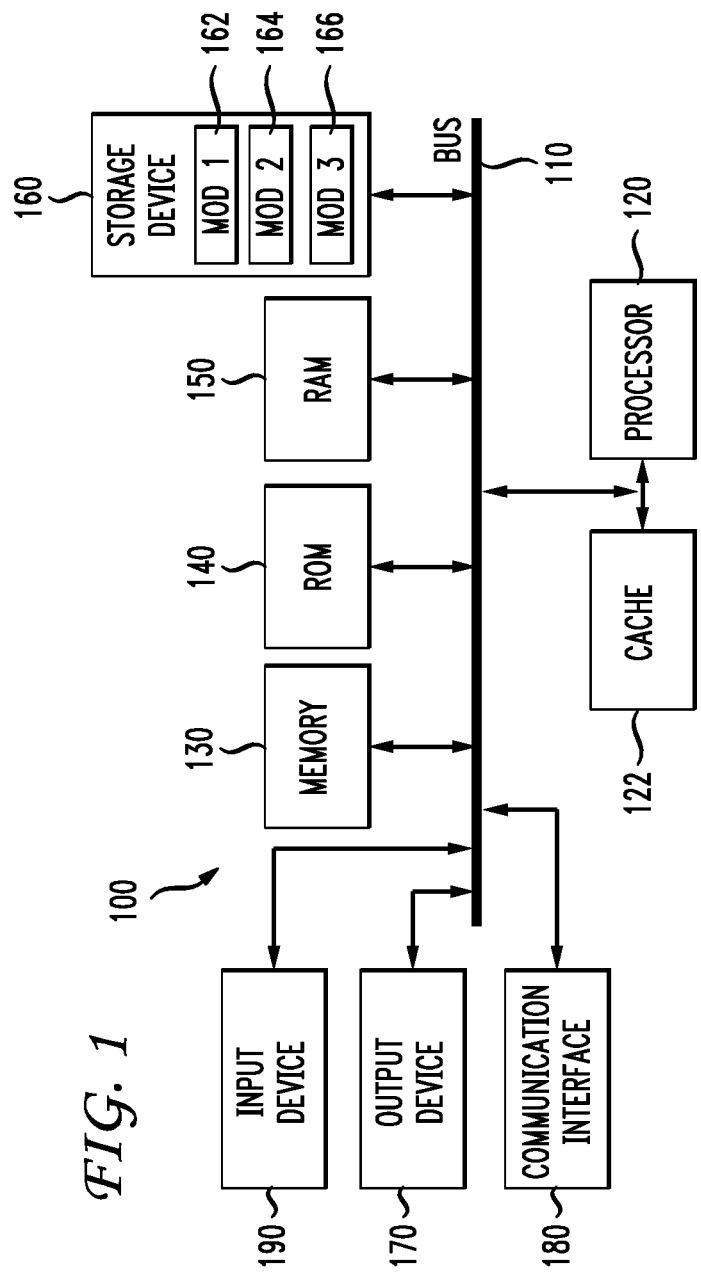
FIG. 1 illustrates an example system configuration.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The scheme proposed addresses the issues raised above by providing a method to compute the maximum and average latency experienced by packets in a flow at every hop. The system collects hop-by-hop latency, jitter and micro-burst statistics per application flows which can then be analyzed along with Tenant and Source and Destination End-Point Group (EPG) information to get fine-grained information on traffic flows. With the ASIC support, all flows in the fabric are monitored in-line and pro-actively records are collected which can be maintained in a time-series database. The flow trace history can then be used to see if performance SLAs are being met with regards to latency, jitter, burst etc., and problems corrected by analyzing misbehaving flows, under-provisioning etc. This is in contrast to the reactive tools which may send similar probes as data-traffic once a problem has occurred. It may not always be possible to re-create the exact same conditions which caused congestion and other performance issues.

The disclosed concepts involve continuously monitoring all applications flows entering a datacenter fabric and collecting performance statistics at every hop which includes, latency, jitter, microburst statistics across all flows in-line in the flow table maintained in hardware. Proactively collecting this information, which is periodically exported to software, can lead to network operators verifying if SLAs for applications in the cloud are being met and identify any problems which happen when all types of traffic simultaneously enter the fabric. For instance, critical application flows can be affected because of sudden sub-second burst created by a low-priority traffic. The approach is proactive rather than reactive where operators try to recreate or trouble-shoot after a problem is detected. The definition of flow is also flexible and can be defined either as an EPG/Tenant along with protocol and L4 port information as well as regular IP based flows. One example method embodiment includes, in each switch of a plurality of switches in a network fabric, grouping all packets entering each respective switch of the plurality of switches based on either 5-tuple applications or Src and Dest EPG (source or destination EPG) based applications, collecting performance statistics at every hop in the network fabric across all flows in a flow table maintained in each respective switch and periodically exporting the performance statistics to analysis module.

Description

The present disclosure addresses the issues raised above. The disclosure provides a system, method and computer-readable storage device embodiments. First a general example system shall be disclosed in FIG. 1 which can provide some basic hardware components making up a server, node or other computer system.

FIG. 1 illustrates a conventional computing system architecture 100 wherein the components of the system are in electrical communication with each other using a bus 110. Exemplary system 100 includes a processing unit (CPU or processor) 120 and a system bus 110 that couples various system components including the system memory 130, such as read only memory (ROM) 140 and random access memory (RAM) 150, to the processor 120. The system 100 can include a cache 122 of high-speed memory connected directly with, in close proximity to, or integrated as part of the processor 120. The system 100 can copy data from the memory 130 and/or the storage device 160 to the cache 122 for quick access by the processor 120. In this way, the cache can provide a performance boost that avoids processor 120 delays while waiting for data. These and other modules can control or be configured to control the processor 120 to perform various actions. Other system memory may be available for use as well. The memory 130 can include multiple different types of memory with different performance characteristics. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

To enable user interaction with the computing device 100, an input device 190 can represent any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems can enable a user to provide multiple types of input to communicate with the computing device 100. The communications interface 180 can generally govern and manage the user input and system output. There is no restriction on operating on any particular hardware arrangement and therefore the basic features here may easily be substituted for improved hardware or firmware arrangements as they are developed.

Storage device 160 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 150, read only memory (ROM) 140, and hybrids thereof.

The storage device 160 can include software modules 162, 164, 166 which include instructions for controlling the processor 120. Other hardware or software modules are contemplated. The storage device 160 can be connected to the system bus 110. In one aspect, a hardware module that performs a particular function can include the software component stored in a computer-readable medium in connection with the necessary hardware components, such as the processor 120, bus 110, display 170, and so forth, to carry out the function.

Figure 2:
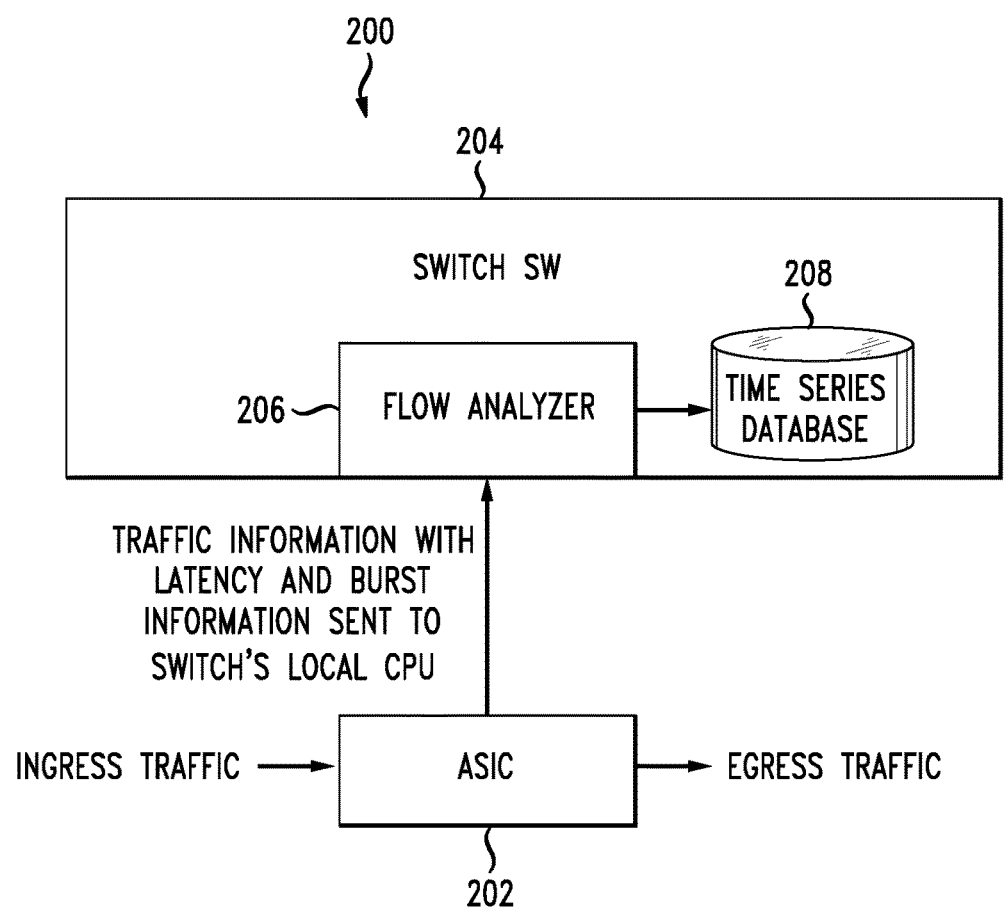
FIG. 2 illustrates an ASIC providing continuous traffic monitoring.

The following disclosure addresses the issues raised above with respect to the reactive nature of current approaches to troubleshooting packet flows. FIG. 2 illustrates an example switch 200 which uses an application-specific integrated circuit (ASIC) 202 which stores and runs switch software 204. The ASIC 202 receives ingress traffic. The ASIC 202 communicates traffic information (e.g SIP, DIP, SPORT, DPOR, Input port etc.), that also includes latency and burst information, to the switch's local central processing unit. Included in the switch software is a flow analyzer 206 that communicates the traffic information to a time series database 208.

The ASIC 202 can collect performance statistics for all application flows and is proactive rather than reactive. Typically, when individuals seek performance data in a network, it is a reactive approach in which probes are initiated that try to discover paths and identify latency or other issues after a problem has occurred. The issue is that it may not be always possible to recreate the exact situation where flows experienced performance problems. Further, network operators may not have visibility that a certain application experienced latency, jitter because certain other applications demonstrated sub-second bursts overloading the buffers at a certain switch.

Disclosed herein is the concept of grouping all packets entering every switch in the fabric into applications flows based on either regular 5-tuple (Src IP, Dst IP, Protocol, L4 Src Port, L4 Dst Port) or EPG based applications (Src EPG, Dst EPG, Protocol, and so forth) specifically for an Application Centric Infrastructure (ACI). The system collects following metrics in-line as traffic flows through the fabric with no human intervention. The metrics can include, for example, one or more of latency, minimum burst, packet and byte count, and so forth. With switch level traffic monitoring, the traffic information from the ASIC 202 is sent to local CPU which has a light weight flow analyzer module to analyze the flow.

Figure 3:
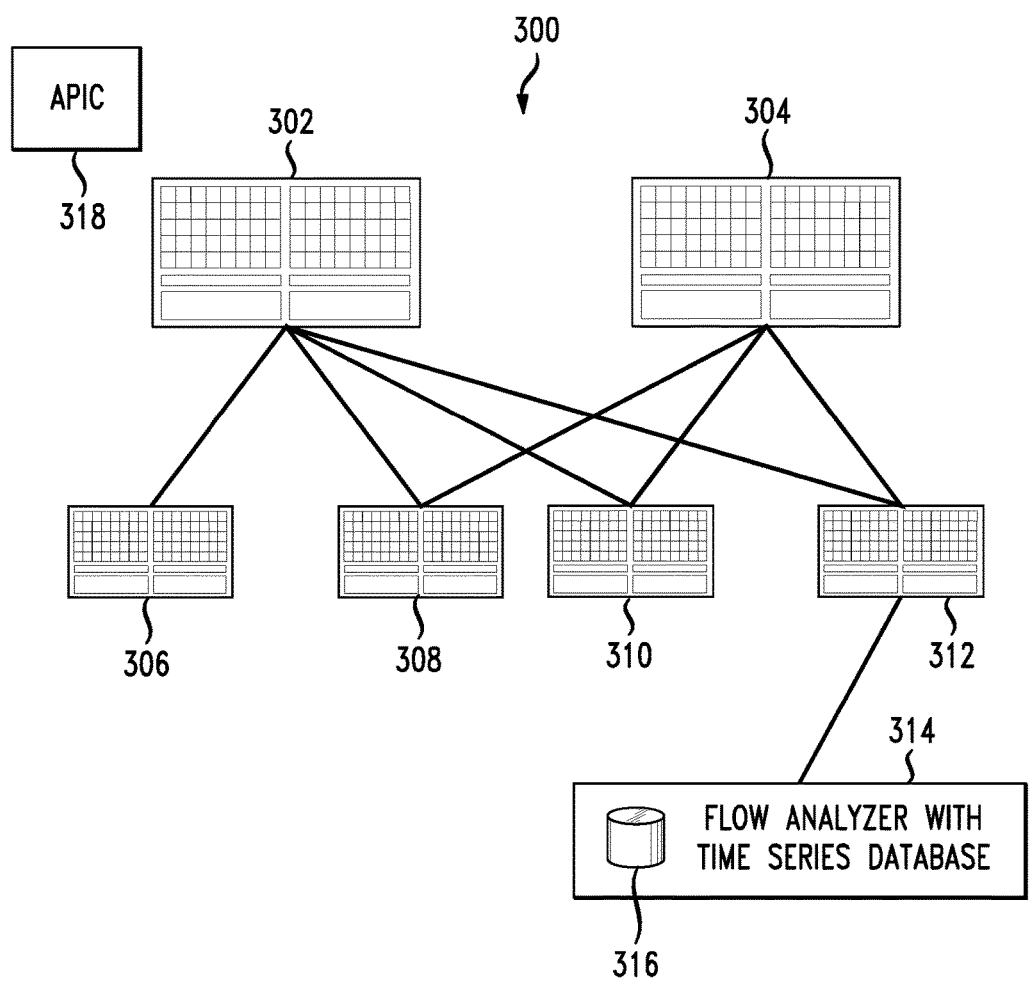
FIG. 3 illustrates continuous traffic monitoring at a fabric level.

The concepts applied herein work for both switch level and fabric level. FIG. 2 illustrates the switch level application and FIG. 3 illustrates an Application Centric Infrastructure Centric (ACI) Fabric Architecture 300 and how the concept and apply to continuous traffic monitoring at the fabric level. An application policy infrastructure controller (APIC) 318 and the leaf and spine switches make up the ACI fabric. Notes 302, 304 represent the spine layer and notes 306, 308, 310, 312 represent a series of lower-tier switches or the leaf layer.

In this two-tier Clos architecture 300 (named after Charles Clos), every lower-tier switch (leaf layer 306, 308, 310, 312) is connected to each of the top-tier switches (spine layer 302, 304) in a full-mesh topology. The leaf layer 306, 308, 310, 312 consists of access switches that connect to devices such as servers. The spine layer 302, 304 is the backbone of the network and is responsible for interconnecting all leaf switches. Every leaf switch connects to every spine switch in the fabric. The path is randomly chosen so that the traffic load is evenly distributed among the top-tier switches. If one of the top tier switches were to fail, it would only slightly degrade performance throughout the data center.

If oversubscription of a link occurs (that is, if more traffic is generated than can be aggregated on the active link at one time), the process for expanding capacity is straightforward. An additional spine switch can be added, and uplinks can be extended to every leaf switch, resulting in the addition of interlayer bandwidth and reduction of the oversubscription. If device port capacity becomes a concern, a new leaf switch can be added by connecting it to every spine switch and adding the network configuration to the switch. The ease of expansion optimizes the IT department's process of scaling the network. If no oversubscription occurs between the lower-tier switches and their uplinks, then a nonblocking architecture can be achieved. With a spine-and-leaf architecture 300, no matter which leaf switch to which a server is connected, its traffic always has to cross the same number of devices to get to another server (unless the other server is located on the same leaf). This approach keeps latency at a predictable level because a payload only has to hop to a spine switch and another leaf switch to reach its destination.

The design 300 enables linear scalability and robust multi-pathing within the fabric is optimized for east-to-west traffic required by applications. No connections are created between leaf nodes or spine nodes because all nonlocal traffic flows from ingress leaf to egress leaf across a single spine switch. The only exceptions to this rule may be certain failure scenarios.

The fabric 300 is designed with application connectivity and policy at the core. This focus allows both traditional enterprise applications and internally developed applications to run side by side on a network infrastructure designed to support them in a dynamic and scalable way. The network configuration and logical topologies that traditionally have dictated application design are instead applied based on application needs. This approach is accomplished through the ACI object model.

Within the APIC 318, software applications are defined logically using constructs that are application centric, rather than network centric. For example, a group of physical and virtual web servers may be grouped in a single tier of a three-tier application. The communication between these tiers and the policies that define that communication make up the complete application. Within the APIC 318, this complete application definition is known as an Application Network Profile.

Application Network Profiles are defined based on the communication, security, and performance needs of the application. They are then used by the APIC 318 to push the logical topology and policy definitions down to stateless network hardware in the fabric. This approach is the reverse of traditional architectures, in which VLANs, subnets, firewall rules, etc. dictate where and how an application can run.

With fabric level traffic monitoring, all the traffic information from each ToR and spine is sent to a server 314. The ToR is a top of the rack switch which contains the switching ASIC and forwards traffic from servers to the network and vice versa. The traffic information is stored in time series data base 316 which can be analyzed to debug latency, micro-burst and jitter problems. The concept in the fabric context is to collect the latency experienced by packets in a flow at every hop in the fabric. The latency statistics (which can include latency and/or micro burst information) are maintained in hardware (such as on each respective switch) as part of the flow table which collects distinct flows entering the switch along with the usual statistics such as byte count/packet count used by Netflow and IPFIX.

To calculate the latency, the ASIC uses the following scheme:

1. All packets leaving the ToR get a timestamp which is added to the packet. There is flexibility in the ASIC to either use the arrival or departure time. Other times can be used as well.

2. When packets enter the spine linecard, the difference between this timestamp in the packet and the current time when the packet is processed by the flow table in the ASIC is used to update the following statistics:

a) the maximum latency seen by any packet in this flow in this export interval; and b) the sum of latency seen by packets in this flow in this export interval.

Other statistics could also be processed. For example, values that may not represent the absolute maximum latency but nearly the maximum latency or a value that reaches a threshold level of latency. Furthermore, other values besides the sum of the latency can be applied as well.

With the packet count statistic collected separately, this information can be used to find the average latency experienced by a particular flow. As the packet gets switched from line card to line card in the spine layer, similar measurements can be recorded in the flow table, as each line card puts the arrival time when the packet enters its parser block into the timestamp header in the packet when it exits, and each line card's flow table calculates latency statistics when processing the packet.

3. Packet egressing the spine carries the timestamp from the egress line card, the egress ToR can again perform the same processing and record the maximum and sum of the latency in its flow table, when the packet hits it.

This information can then by analyzed as flow history traces at every switch to identify any latency related issues experienced by any application and can also be used to fire any alerts if latency experienced exceeds a threshold. This scheme assumes the hardware clocks in the fabric are synchronized through a time-synchronization protocol such as IEEE 1588.

Periodic latency data, which is collected at msec granularity, can also give jitter statistics experienced by the flow. For example, granularity at a 1/128 ms level can be obtained. Various time frames can be utilized for different levels of granularity. The level of granularity can be determined dynamically based on an inference that a problem has developed or is about to start to develop. In other words, latency data may be collected at the level of seconds or minutes but that value can dynamically change to collecting latency data at a msec level of granularity given a triggering event, predicted events, external events, and so forth. Any number of factors could be used to select the granularity level as well as how and when to change that level dynamically, manually, or statically. Since the information is stored in a time series data base, the user can determine how to query and interpret the information. For example, the user can query the flows that are having latency issues in the seconds range.

The system also can collect maximum micro-burst statistics with every flow record. A micro-burst for a flow is defined as number of bytes received in a small time segment within the export interval. Assume the export interval (the time after which flow table records are flushed and exported to a collector) is 128 msec. The export level can be divided into 128 chunks and the micro-burst collection inside the flow table keeps track of the number of bytes for the flow received within each 1 msec interval inside this 128 msec. The system updates the flow record with the max microburst seen so far as well as the time offset from the last flush of the flow table records at which this maximum micro-burst was seen.

The flow records exported by the hardware flow table at a certain configured export interval can also be aggregated across a bigger timer interval in software and then exported periodically to a time-series database 316 to preserve flow trace history. The system can also add other meaningful information such as Source and Destination End-point Group and Tenant information per flow record so that the user can run meaningful queries based on ACI model.

With this information, datacenter operators can not only find the latency spikes or jitter seen for a flow and from EPG-EPG but also within that export interval which other floes and EPG traffic demonstrated bursty behavior at a much more granular interval than the aggregate byte count which netflow/IPFIX exports. A flow may show a sudden spike in one small interval and then die down so while the aggregate bytes still seem fine, the instantaneous overload may cause buffeting and other congestion problems and this finegrained visibility into traffic streams can prove very useful.

Figure 4:
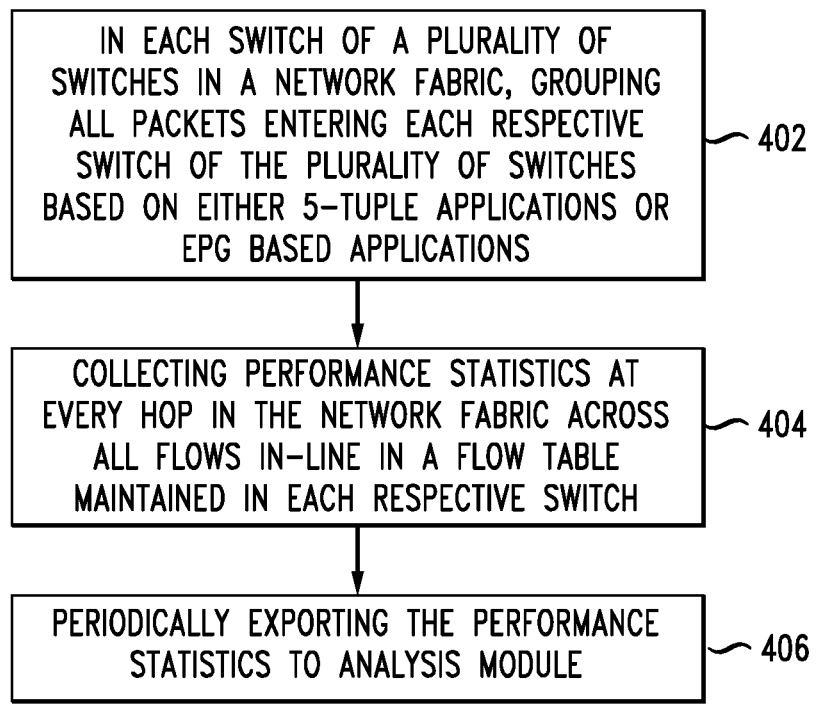
FIG. 4 illustrates a method embodiment.

FIG. 4 illustrates a method aspect of this disclosure. The method includes, in each switch of a plurality of switches in a network fabric, grouping all packets entering each respective switch of the plurality of switches based on either 5-tuple applications or EPG based applications (402), collecting performance statistics at every hop in the network fabric across all flows in-line in a flow table maintained in each respective switch (404) and periodically exporting the performance statistics to an analysis module (406).

The performance statistics can include one or more of latency, jitter and microburst statistics. Other statistics, like packet and byte count statistics, can are contemplated as well. The method can further include computing a maximum latency and an average latency experienced by packets at every hop. Using this approach, spikes experienced by individual frames which identify a problem can be identified from the performance statistics. In one example, the 5-tuple applications comprise one or more of Src IP, Dst IP, Protocol, L4 Src Port, L4 Dist Port. In another aspect, the EPG based applications comprise one or more of Src EPG, Dst EPG, Protocol, and so forth. The packets entering each respective switch can be sent to a local central processing unit on the switch. The switch can include a light weight flow analyzer module which analyzes the flow.

There are number of advantages to the approach disclosed herein, Netflow and formats export the first and last time-stamp for a flow in an export interval. This data can typically help in calculating the duration of the flow but cannot pinpoint if certain frames within the flow experienced latency spikes at certain hops. The concepts disclosed herein relate to a method to compute the maximum and average latency experienced by packets in a flow at every hop which can help in identifying any spikes experienced by individual frames and lead to quick isolation of the culprit switch. This data is exported at a msec periodicity from the ASIC so that the system can find fine-grained stats for jitter experienced by the applications, Also, the system monitors any instantaneous bursts experienced per flow apart from the aggregate byte count for a fine-grained visibility into all application traffic streams entering each switch in the fabric.

The disclosed approach which is implemented in the ASIC monitors all packets entering the switch. The approach is pro-active rather than reactive, In a reactive model, operators try to recreate issues after a problem is detected and it may not be possible to identify at a sub-second granularity what happened in the fabric. Assume a flow X was affected because a flow Y suddenly spiked and different classification schemes are needed to protect flow X. Operators may not know a priori about flow Y causing problem for flow X.

The disclosed approach uses the flow table ASIC sensor which can monitor all packets entering the switch, so scale is much higher than trying to create access control lists and deciding on which flows to monitor, Network operators can decide to monitor a. flow X which experienced jitter, latency spikes, but may not know that the underlying cause was flow Y which was demonstrating bursty behavior at a msec granularity interval. The present approach involves proactively monitoring all flows.

A cloud service provider can use such a scheme to guarantee performance SLAs for application flows and maintain rich history to isolate and debug problems in the fabric. For an ACI context, instead of classifying packets into regular IP based flows, using the ASIC allows classification in terms of source/destination EPCis, tenants along with other L4 protocol and port parameters, so the system can glean these statistics at the granularity desired. The approach is also scalable at the fabric level. The bandwidth requirement is also less, the worst case for each ToR is 19.2 MBps, which is very efficient compared to SPAN/ERSPAN.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method comprising:
   grouping all packets entering each switch of a plurality of switches in a network fabric, the grouping based on end point group (EPG) based applications;
   collecting performance statistics at every hop in the network fabric across all flows in-line in a flow table maintained at each switch; and
   periodically exporting the performance statistics to an analysis module.

2. The method of claim 1, wherein the performance statistics include one or more of latency, jitter, or microburst statistics.

3. The method of claim 1, further comprising:
   computing a maximum latency and an average latency experienced by the packets at every hop.

4. The method of claim 1, further comprising:
   isolating one of the plurality of switches based on the performance statistics,
   wherein,
      the performance statistics identify a spike experienced by an individual frame, and
      the spike identify a problem associated with the one of the plurality of switches.

5. The method of claim 1, wherein the EPG based applications comprise one or more of Src EPG, Dst EPG, or Protocol.

6. The method of claim 1, further comprising:
   sending the packets entering each switch to a local central processing unit at each switch, and
   analyzing each of the flows via a light weight flow analyzer module at each switch.

7. The method of claim 6, further comprising:
   storing, via the light weight flow analyzer module at each switch, traffic information in a time series database.

8. A system comprising:
   a processor; and
   a computer-readable storage device storing instructions which, when executed by the processor, cause the processor to perform operations comprising:
      grouping all packets entering each switch of a plurality of switches in a network fabric, the grouping based on end point group (EPG) based applications;
      collecting performance statistics at every hop in the network fabric across all flows in-line in a flow table maintained at each switch; and
      periodically exporting the performance statistics to an analysis module.

9. The system of claim 8, wherein the performance statistics comprise one or more of latency, jitter, or microburst statistics.

10. The system of claim 8, wherein the instructions, when executed by the processor, cause the processor to perform further operations comprising:
    computing a maximum latency and an average latency experienced by the packets at every hop.

11. The system of claim 8, wherein the instructions, when executed by the processor, cause the processor to perform further operations comprising:
    isolating one of the plurality of switches based on the performance statistics,
    wherein,
       the performance statistics identify a spike experienced by an individual frame, and
       the spike identify a problem associated with the one of the plurality of switches.

12. The system of claim 8, wherein the EPG based applications comprise one or more of Src EPG, Dst EPG, or Protocol.

13. The system of claim 8, further comprising:
    a local central processing unit at each switch, the local central processing unit configured to receive the packets entering a respective one of the plurality of switches; and
    a light weight flow analyzer module at each switch, the light weight flow analyzer module configured to analyze a respective one of the flows.

14. The system of claim 13, wherein the light weight flow analyzer module is configured to store traffic information in a time series database.

15. A non-transitory computer-readable storage device storing instructions which, when executed by a processor, cause the processor to perform operations comprising:
    grouping all packets entering each switch of a plurality of switches in a network fabric, the grouping based on end point group (EPG) based applications;
    collecting performance statistics at every hop in the network fabric across all flows in-line in a flow table maintained at each switch; and
    periodically exporting the performance statistics to an analysis module.

16. The non-transitory computer-readable storage device of claim 15, wherein the performance statistics comprise one or more of latency, jitter, or microburst statistics.

17. The non-transitory computer-readable storage device of claim 15, wherein the instructions, when executed by the processor, cause the processor to perform further operations comprising:

computing a maximum latency and an average latency experienced by the packets at every hop.

18. The non-transitory computer-readable storage device of claim 15, wherein the instructions, when executed by the processor, cause the processor to perform further operations comprising:
  isolating one of the plurality of switches based on the performance statistics,
  wherein,
    the performance statistics identify a spike experienced by an individual frame, and
    the spike identify a problem associated with the one of the plurality of switches.

19. The method of claim 1, wherein the performance statistics include latency, jitter, and microburst statistics.

20. The system of claim 8, wherein the performance statistics include latency, jitter, and microburst statistics.

* * * * *